United States Patent [19]

Asano et al.

[11] Patent Number: 5,819,530
[45] Date of Patent: Oct. 13, 1998

[54] INTERNAL COMBUSTION ENGINE CONTROLLER WITH EXHAUST GAS PURIFICATION CATALYST AND ITS DETERIORATION MONITORING SYSTEM

[75] Inventors: Seiji Asano, Katsuta; Toshio Ishii, Mito, both of Japan; Masayoshi Kaneyasu, Farmington Hills, Mich.; Kazuya Kawano; Takashi Mukaihira, both of Katsuta, Japan

[73] Assignee: Hitachi, Ltd., Japan

[21] Appl. No.: 978,930

[22] Filed: Nov. 18, 1992

[30] Foreign Application Priority Data

Nov. 18, 1991 [JP] Japan ................................... 3-301519

[51] Int. Cl.$^6$ ............................................. F01M 3/00
[52] U.S. Cl. ............................................ 60/277; 60/285
[58] Field of Search ............................. 60/274, 276, 277, 60/285

[56] References Cited

U.S. PATENT DOCUMENTS 4,622,809  11/1986  Abthoff et al. .......................... 60/274
5,179,833   1/1993  Kuroda et al. ........................... 60/277

FOREIGN PATENT DOCUMENTS 35 00 594 A1  7/1986  German Dem. Rep. .
35 03 381 A1  8/1986  German Dem. Rep. .

OTHER PUBLICATIONS

W.B. Clemens, M.A. Sabourin, T. Rao, "Detection of Catalyst Performance Loss Using on–Board Diagnostics", SAE paper 90 00 62, 1990.
J. Kasedorf, "Benzineinsoritzung", Vogel–Verlage, Würzburg 1983, p. 296.
SAE Technical Paper Series—900062 pp. 1–17. Mar. 1990.

*Primary Examiner*—Noah P. Kamen
*Attorney, Agent, or Firm*—Evenson, McKeown, Edwards & Lenahan P.L.L.C.

[57] ABSTRACT

A conversion efficiency of a catalyst is determined by a cross correlation function of a cross-correlation between an output of an oxygen sensor at the upstream of the catalyst and an output of an oxygen sensor at the downstream of the catalyst, to thereby monitor deterioration index of the catalyst. Then, an air and fuel ratio is obtained from at least one of the outputs of the two oxygen sensors, to thereby adjust a fuel supply quantity, so that the fuel supply quantity can be controlled even during a period when the catalyst is being analyzed, without deviating the air and fuel ratio from a target air and fuel ratio.

16 Claims, 10 Drawing Sheets

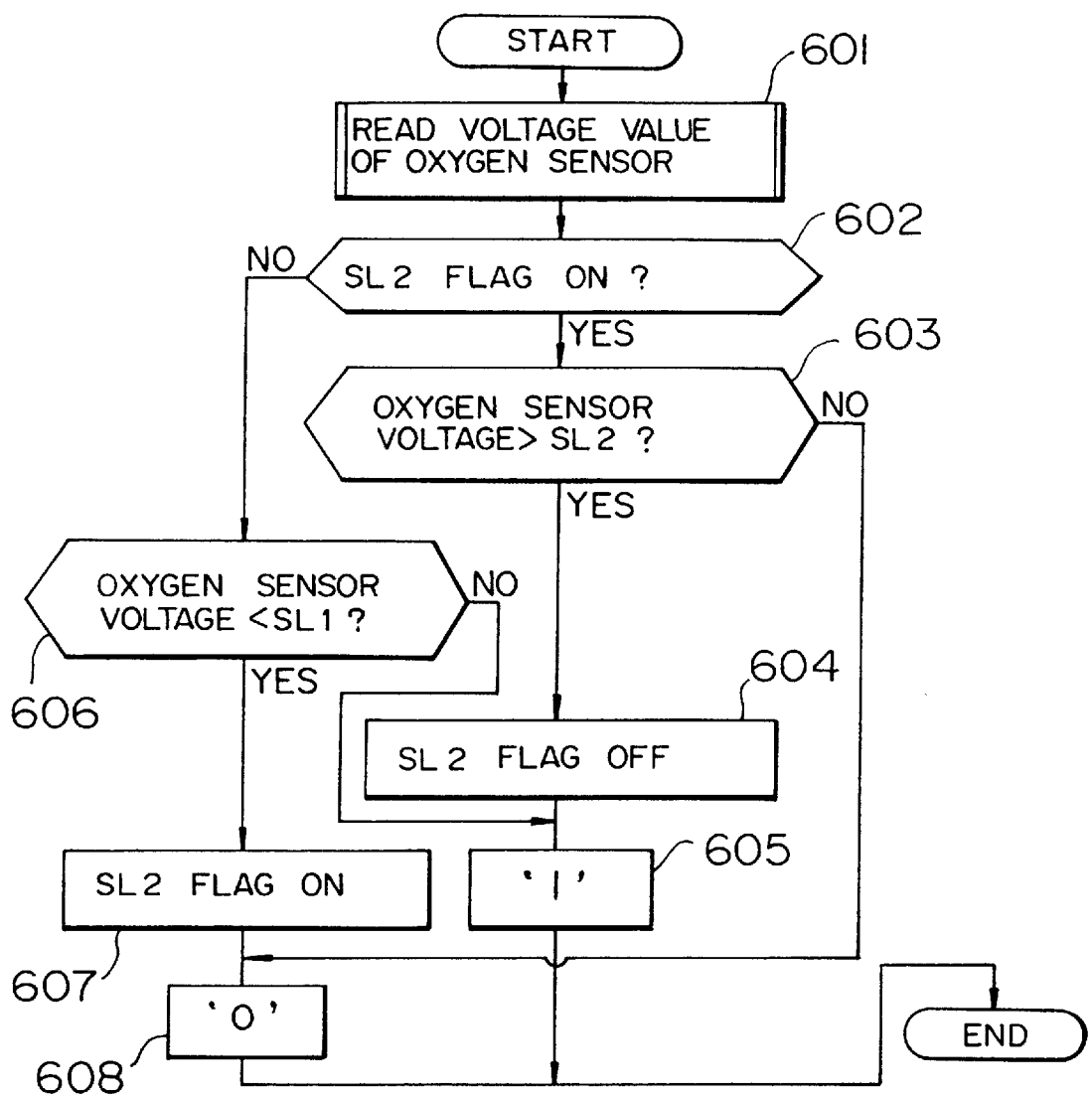

INTERNAL COMBUSTION ENGINE CONTROLLER WITH EXHAUST GAS PURIFICATION CATALYST AND ITS DETERIORATION MONITORING SYSTEM

BACKGROUND OF THE INVENTION

The present invention relates to a control apparatus for an internal combustion engine having a catalyst unit for eliminating hazardous components included in an exhaust gas, and more particularly to an apparatus for deriving a catalyst deterioration index while controlling of a quantity fuel to be supplied to the internal combustion engine.

According to a known prior-art technique, a degree of deterioration index of a catalyst has been determined by superposing a search signal on a fuel jet signal and monitoring an output of an oxygen density sensor downstream of the catalyst based on the superposed signals, as described in the SAE paper 900062.

SUMMARY OF THE INVENTION

According to the above-described conventional technique, however, the output of the oxygen density sensor is devoted to monitoring, and normal feedback control of the air and fuel ratio is not carried out. As a result, the actual air and fuel ratio can deviate from a target air and fuel ratio during a period while deterioration index of a catalyst is being monitored. It is, therefore, an object of the present invention to make it possible to determine a deterioration index of a catalyst without interrupting the feedback control of the air and fuel ratio.

It is possible to achieve the above object by sharing at least a part of a signal used for normal feedback control of an air and fuel ratio of a fuel supply quantity and a signal to be used for monitoring deterioration index of a catalyst.

To be more specific, an oxygen density sensor in an exhaust gas is installed at each of the front and back of a catalyst, and outputs of the two sensors are compared to monitor a deterioration index of the catalyst, and a fuel supply quantity is adjusted according to at least one of the two outputs of these sensors.

According to the configuration of the present invention, it is possible to carry out both monitoring of the deterioration index of a catalyst and a feedback control of an air and fuel ratio, because a signal for the monitoring and a signal for a feedback of the air and fuel ratio can be shared. Further, since feedback control of an air and fuel ratio can also be carried out during a monitoring period, it is possible to control an internal combustion engine without causing a deviation of an air and fuel ratio from a target air and fuel ratio, even during a period when monitoring is being carried out.

BRIEF DESCRIPTION OF THE DRAWINGS

FIG. 6 is a flow chart for showing a process for establishing a hysteresis to an analog input;

DESCRIPTION OF THE PREFERRED EMBODIMENTS

Figure 1:
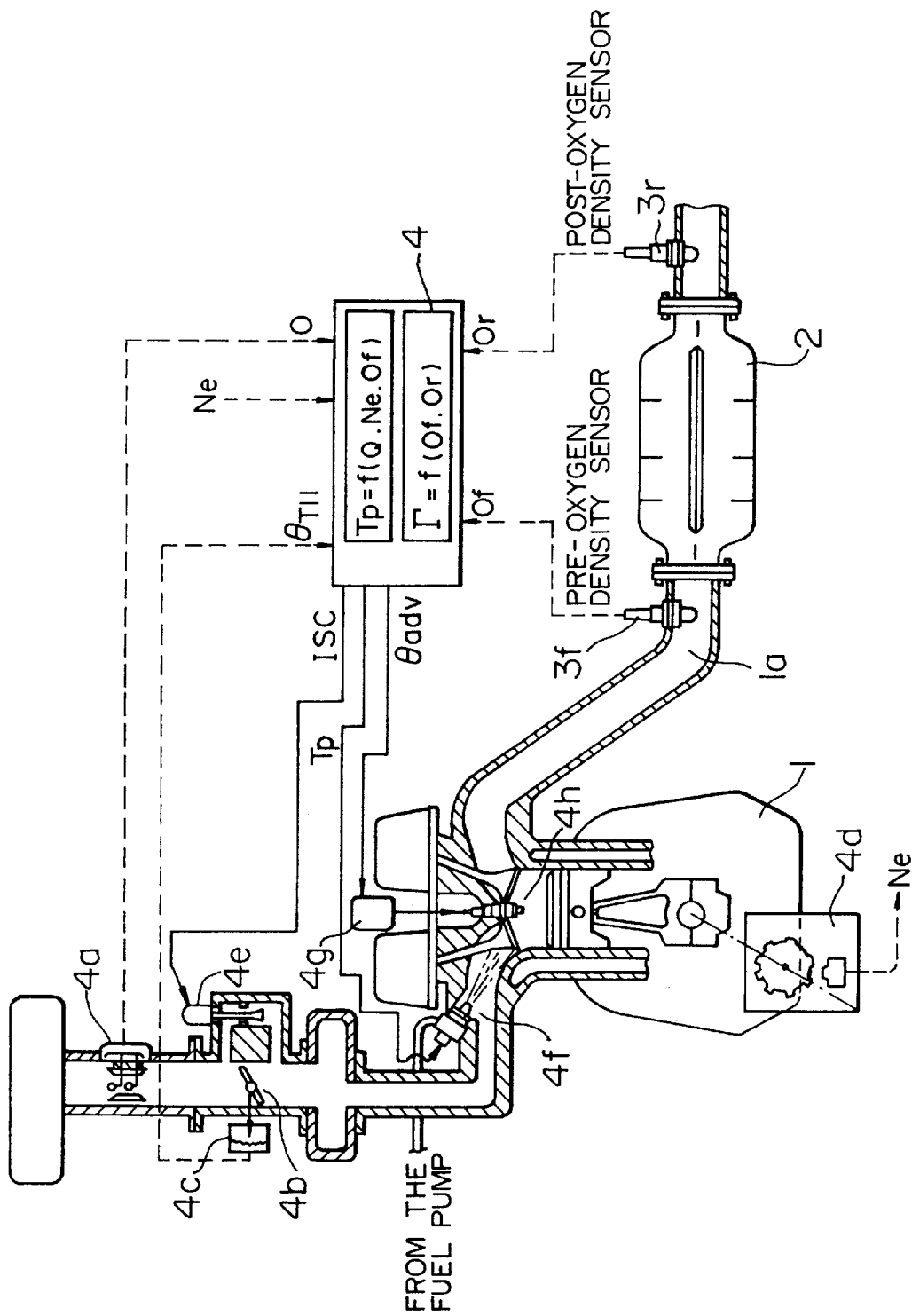
FIG. 1 is a partial cross-sectional diagram for showing a first embodiment of the present invention.

FIG. 1 shows an embodiment of the present invention, comprised of an internal combustion engine 1, a three way catalyst 2 connected to an exhaust pipe 1a of the internal combustion engine 1 for purifying hydro-carbon, carbon monoxide and nitrogen oxide included in an exhaust gas by oxydizing and reducing operations, oxygen sensors 3f and 3r disposed in the exhaust pipes, at the front and back of the three way catalyst respectively, for detecting density of oxygen included in the exhaust gas and outputting density signals in the form of voltage of an or based on the detected density, and an internal combustion engine control unit 4 digital computer or an equivalent logical arithmetic device, for controlling the internal combustion engine.

As shown in FIG. 1, the internal combustion engine control unit 4 is electrically connected to a mass air flow meter 4a for measuring a quantity of air taken into the internal combustion engine, a throttle opening sensor 4c for detecting the position of a throttle valve 4b, a crank angle sensor 4d for detecting a crank angle of the output shaft of the internal combustion engine, an idle speed controller 4e for stabilizing an idle speed of the internal combustion engine, a fuel injector valve 4f for injecting a fuel based on a control signal Tp from the internal combustion engine control unit, and an ignition coil 4g connected to an ignition plug 4h for igniting based on an ignition signal θ adv.

Figure 2:
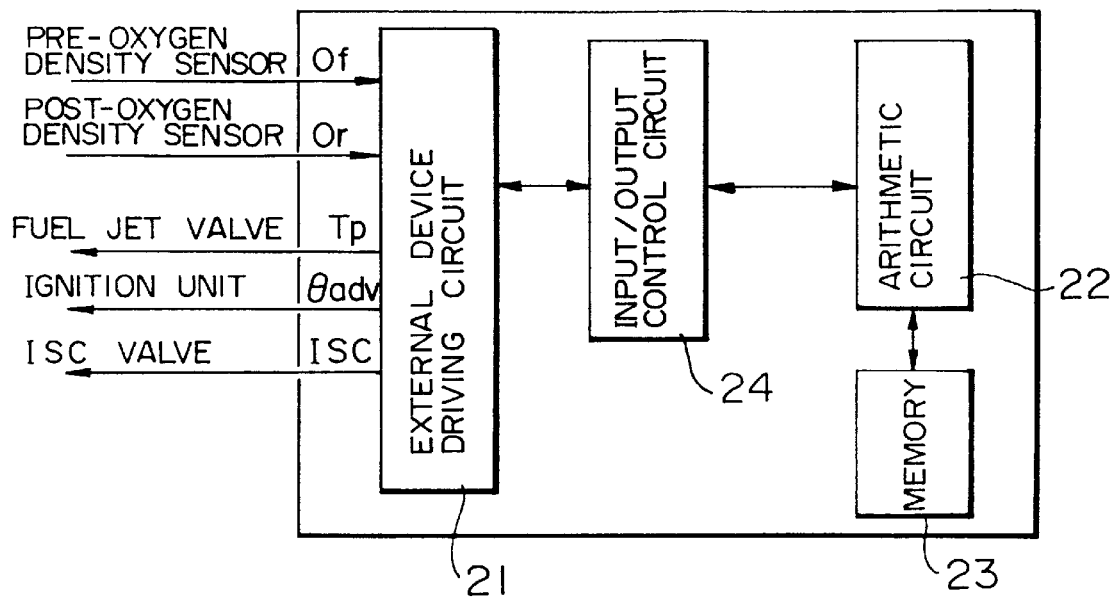
FIG. 2 is a block diagram of a circuit of the controller of an internal combustion engine.

FIG. 2 shows an internal combustion engine control unit according to the present invention, which consists of an external device driving circuit 21 for directly handling voltages of external actuators, sensor, etc., an arithmetic circuit 22 having a microcomputer for carrying out a digital arithmetic processing, or a circuit with an equivalent function, a memory 23 (including both nonvolatile and volatile) for storing constants, variables and programs for the arithmetic circuit 22, and an input/output control circuit 24. The input/output control circuit 24 sends a pulse signal and a duty signal to the external device driving circuit 21 based on a signal from the arithmetic circuit 22, converts an analog signal of the external device driving circuit 21 into a digital signal and sends the digital signal to the arithmetic circuit 22. In the embodiment of FIG. 2, an output signal Of of the pre oxygen density sensor 3f and an output signal Or of the post oxygen density sensor 3r are inputted to the internal combustion engine control unit, and a fuel injection quantity signal Tp, an ignition signal θ adv and an idle revolution control signal ISC are outputted from the internal combustion engine control unit.

Figure 3:
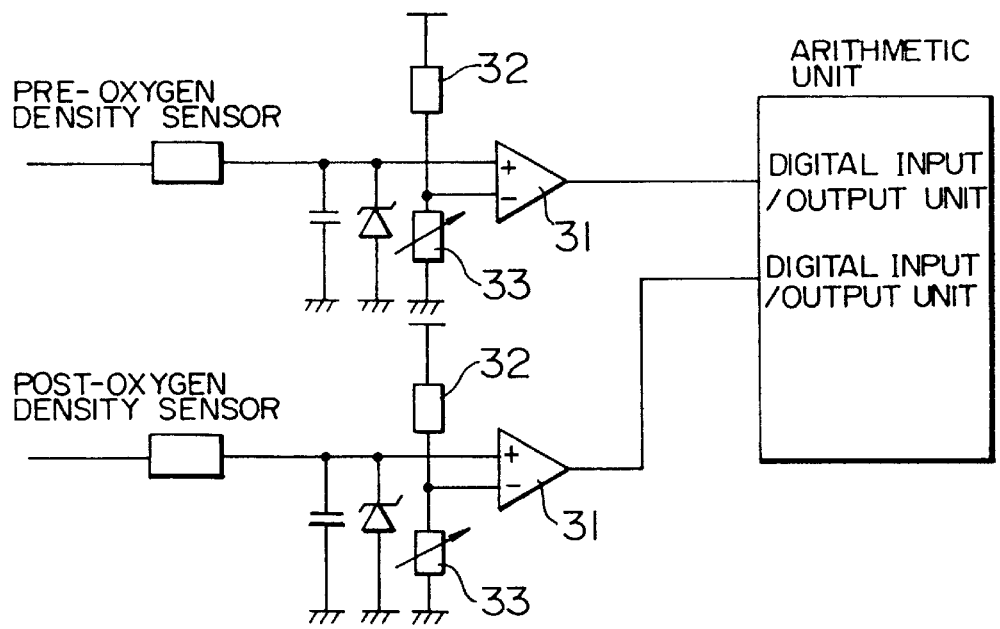
FIG. 3 is a block diagram showing an arrangement for inputting a voltage signal from an oxygen sensor.
Figure 4:
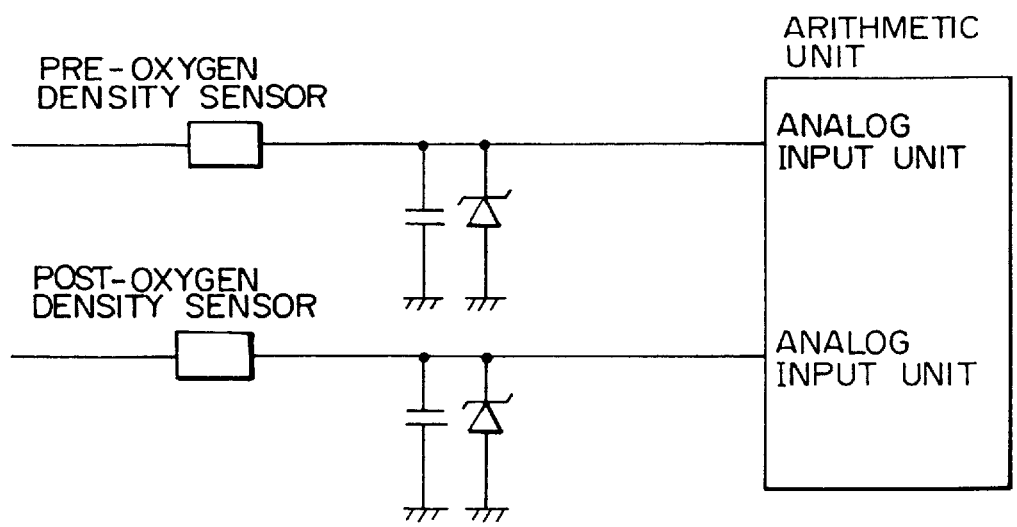
FIG. 4 is a block diagram of another arrangement a method for taking in an output voltage of an oxygen sensor.

FIGS. 3 and 4 show apparatus for inputting voltage signals of the pre oxygen density sensor 3f and the post oxygen density sensor 3r to the arithmetic circuit 22. In FIG. 3, analog signals of the oxygen sensors are normalized into digital signals by comparison with a threshold voltage value (determined by a resistor 32 and a resistor 33) using a comparator 31. The normalized signals are inputted to a digital input of the arithmetic unit. FIG. 4 shows an example of apparatus for directly inputting output signals of the oxygen sensors to an analog input of the arithmetic unit. Within the analog input, the analog signals are converted into digital signals by an A/D converter or the like so that the arithmetic unit can handle the digital signals. It is needless to mention that an excess voltage protecting circuit and a noise elimination low pass filter are added to the above two circuits.

Figure 5:
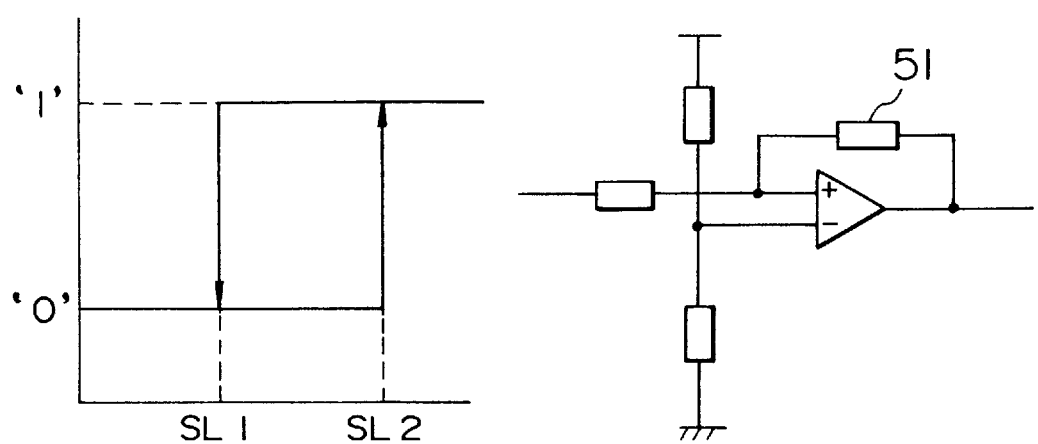
FIG. 5 is a block diagram showing one embodiment for eliminating a noise included in an output voltage signal from an oxygen sensor.

FIG. 5 shows an arrangement for eliminating a relatively large noise which cannot be eliminated by the methods shown in FIGS. 3 and 4. When a feedback resistor 51 is added, a hysteresis of a slice level SL1 and a slice level SL2 can be obtained.

FIG. 6 is a flow chart for establishing a hysteresis of the analog inputs shown in FIG. 4. At Step 601, a voltage of the oxygen sensor is read and is converted to a digital signal. At Step 602, a decision is made whether an SL2 flag is ON or not. If the flag is ON, a decision is made at Step 603 whether the output voltage of the oxygen sensor is larger than the slice level SL2 or not. If the output voltage of the oxygen sensor is larger than the slice level SL2, the flag is set to OFF and 1 is outputted at Steps 604 and 605. If the output voltage is smaller than the slice level SL2, 0 is outputted. If the flag is OFF at Step 602, a decision is made whether the voltage of the oxygen sensor is smaller than the slice level SL1 or not and a similar process is taken at Steps 606 to 608.

A method which does not use this hysteresis is shown in the following expression:

$$\begin{cases} O_2f(S) = \frac{1}{1+Sf} O_2(S) & (1\text{-}1) \\ O_2f(n) = \text{WEIGHT} * O_2(n) + & (1\text{-}2) \\ \qquad (1 - \text{WEIGHT}) * O_2f(n-1) & \end{cases}$$

The expression 1-1 shows a method for filtering an inputted voltage of the oxygen sensor with a time-lag of first order. The expression 1-2 shows a method for achieving the filtering of the expression 1-1 with a digital signal in the control unit. A noise is eliminated by weight average of the previous input and the current input.

Figure 7A:
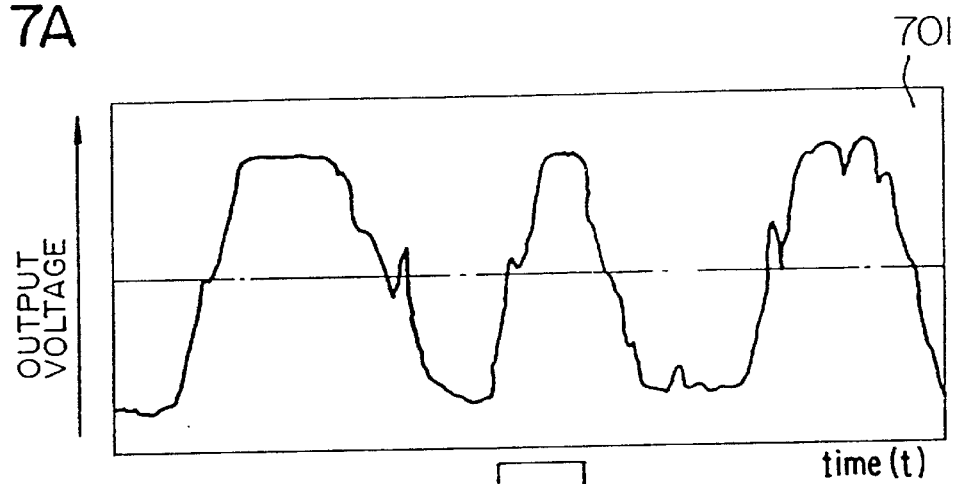
FIGS. 7A and 7B are graphs showing one embodiment of a normalized value of an output voltage of an oxygen sensor.
Figure 7B:
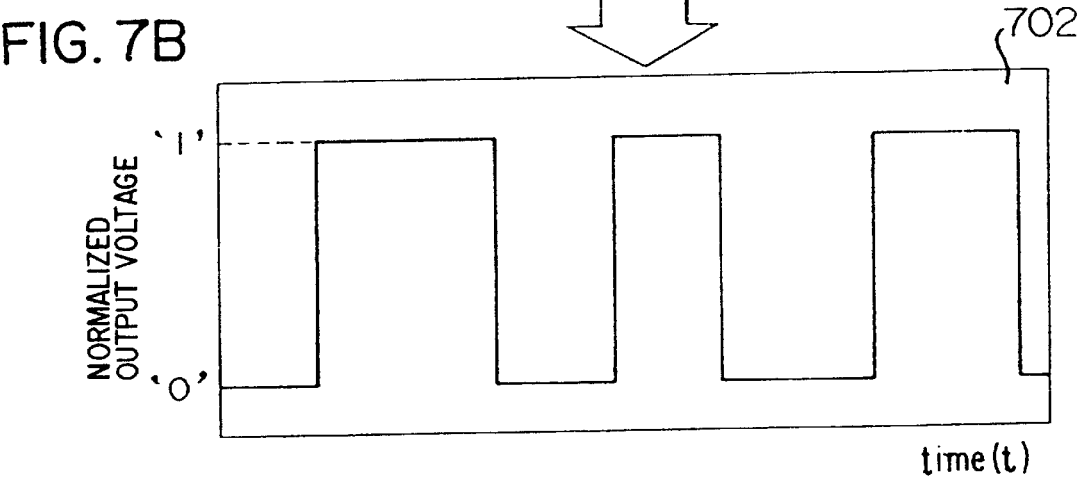

FIGS. 7A and 7B show output voltages of the oxygen sensor. 701 in FIG. 7A designates an actual output voltage of the oxygen sensor, and 702 in FIG. 7B designates a result of normalizing the output voltage by using the above-described noise elimination method. The normalized signal is stored in the memory of the arithmetic unit. Basic formulas of the cross correlation functional formula are shown below:

$$\begin{cases} Y_{xy}(m) = \frac{1}{N\sigma_x \times \sigma_y} \sum_{n=0}^{N-1} x_n y_{n+m} & (2\text{-}1) \\ r = \frac{1}{N} \left\{ \max \sum_{n=0}^{N-1} O_2PR_{(n)} * O_2PO_{(n+m)} + \right. & (2\text{-}2) \\ \qquad \left. \max \sum_{n=0}^{N-1} \overline{O_2PR_{(n)}} * \overline{O_2PO_{(n+m)}} \right\} & \end{cases}$$

The expression 2-1 shows a basic formula of a cross correlation, in which x and y designate respective inputs and σ designates respective variances. N designates a number of inputs. This formula is used when a calculation is carried out based on analog voltage values. However, it is difficult to calculate in this case, because a memory and a calculation speed are limited for the arithmetic unit inside the control unit. Therefore, the expression 2-2 is used based on digital values. According to this formula, a maximum value of a correlation characteristic of a normalized value of two inputs, and a maximum value of a correlation characteristic of inversed normalized values of the two inputs are added together and then the sum is divided by the number of the inputs.

Figure 8A:
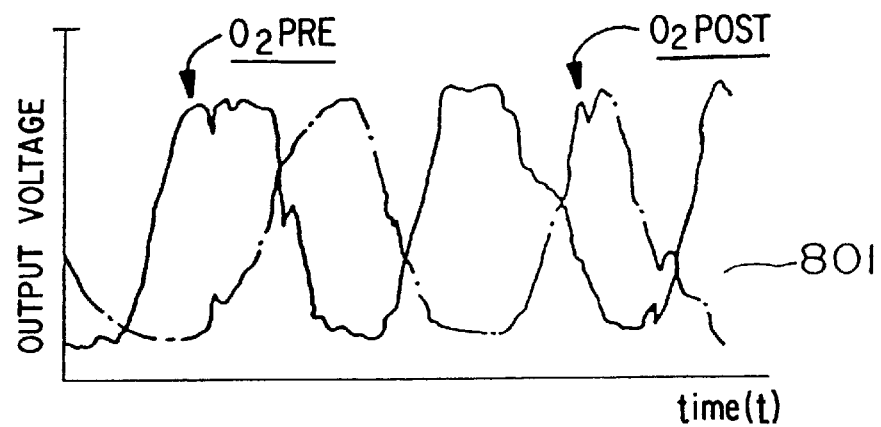
FIGS. 8A and 8B are graphs showing one embodiment of output voltages of a pre oxygen sensor and a post oxygen sensor and a normalized value of an oxygen sensor.
Figure 8B:
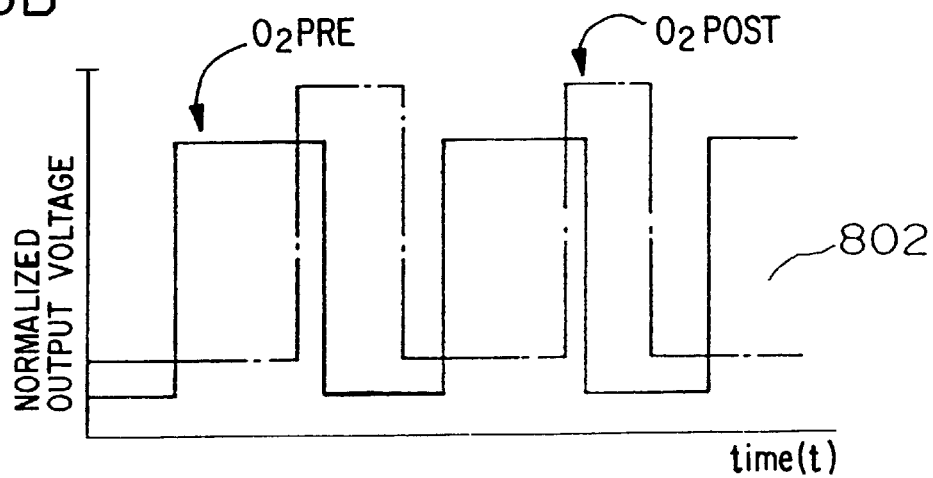

FIGS. 8A and 8B show output voltages of the pre oxygen density sensor 3f and the post oxygen density sensor 3r and their normalized values respectively. 801 in FIG. 8A designates output voltages and 802 in FIG. 8B designate normalized values.

Figure 9:
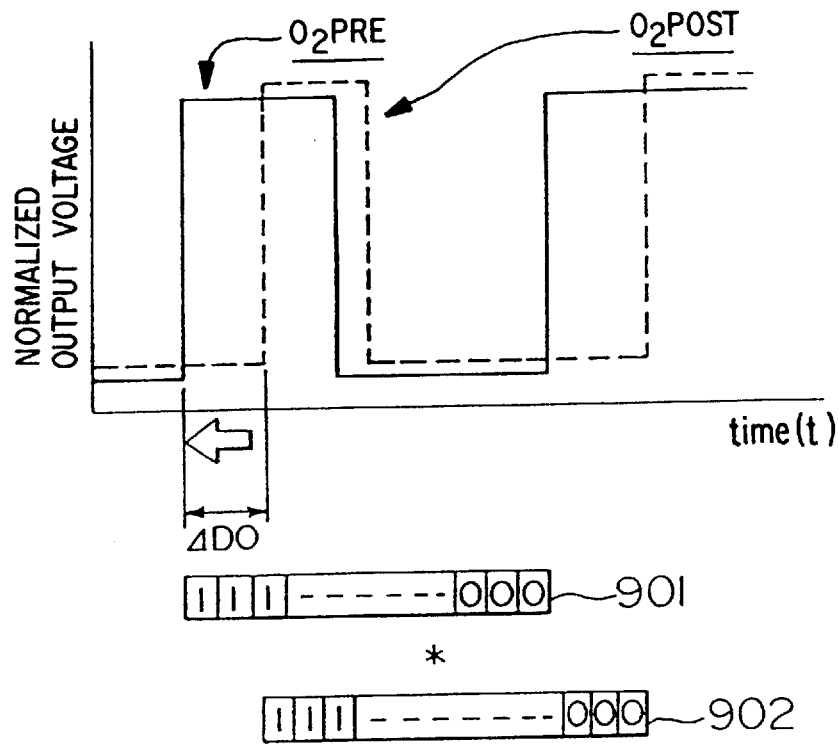
FIG. 9 is a graph showing an example of a phase difference between normalized values of a pre oxygen density sensor and a post oxygen density sensor.

FIG. 9 shows a method for calculating a cross correlation of normalized values of the pre oxygen density sensor and the post oxygen density sensor respectively. 901 designates a register of the memory in which a normalized value of the signal from the pre oxygen density sensor is stored and 902 designates a register of the memory in which a normalized value of the signal from the post oxygen density sensor is stored. Each register stores one cycle component of the output of each oxygen sensor. In the case of a correlation characteristic calculation, two cycle components are necessary for a normalized value of the post oxygen density sensor. Therefore, one cycle component is doubled and two cycle components are stored in this register. There is a time lag ΔD0 between the post oxygen density sensor and the pre oxygen density sensor due to the installation positions of these sensors. Therefore, a correlation characteristic calculation is carried out by sliding the phase by a factor of this time lag ΔD0.

Figure 10:
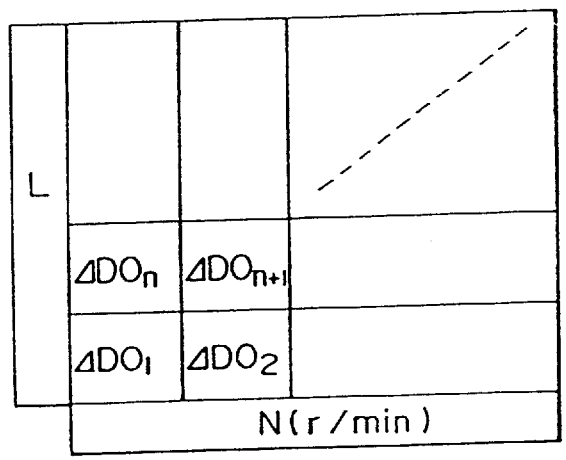
FIG. 10 shows a compensation table for compensating a phase difference between a pre oxygen density sensor and a post oxygen density sensor.

FIG. 10 is a table for showing a compensation component of the positional deviation between the front and post oxygen density sensors. In the present embodiment, the lead and the idle speed of the internal combustion engine are used as parameters for the retrieval of this table.

Basic formulas of a mean and a variance respectively of a cross correlation value for each cycle of the oxygen sensor are shown below:

$$\begin{cases} \bar{r} = \frac{1}{Nr} \sum_{n=0}^{Nr-1} r_n & (3\text{-}1) \\ r_o = \frac{1}{N} \sum_{n=0}^{N-1} (\bar{r} - r_n)^2 & (3\text{-}2) \end{cases}$$

Figure 11:
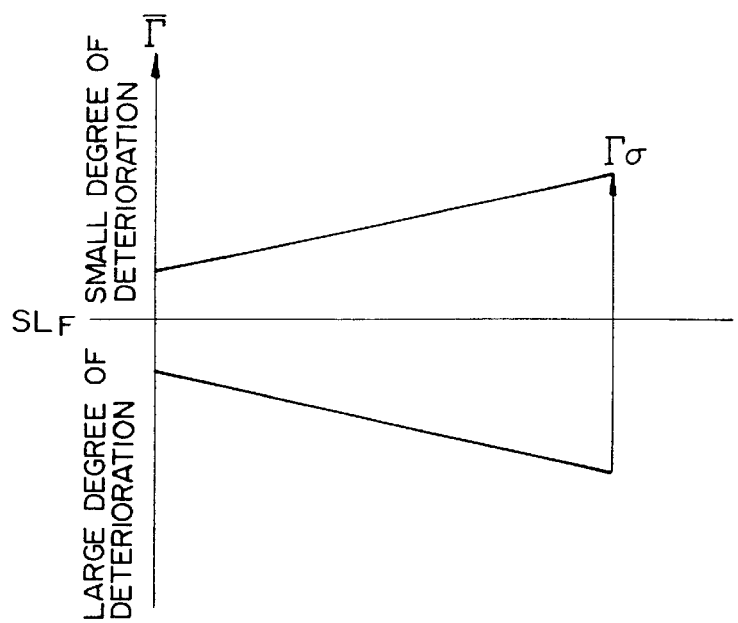
FIG. 11 is a graph showing a relationship between a degree of deterioration index and a deterioration index of a three way catalyst respectively.

The expression 3-1 shows a mean value of the cross correlation value and the expression 3-2 shows a variance from each cross correlation value. FIG. 11 shows a relationship between a degree of deterioration index and a deterioration index of a three way catalyst respectively, the deterioration index of the three way catalyst being obtained as a mean value calculated by the expression 3-1. When the degree of deterioration index is medium (that is, around a slice level SLf), the values calculated according to the expression 3-1 show variations. Therefore, the variance calculated by the expression 3-2 is used to decide the degree of deterioration index. The degree of deterioration is small when the variance is large, and the degree of deterioration index is large when the variance is small.

Figure 12:
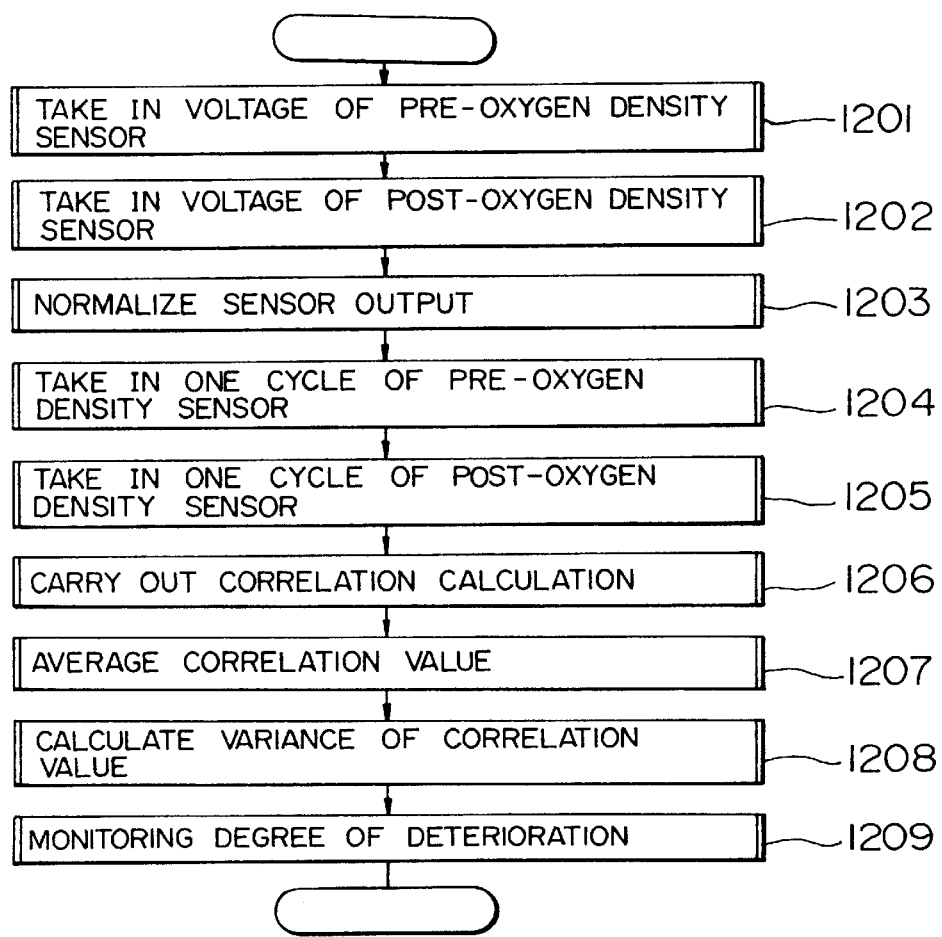
FIG. 12 is a general flow chart according to an embodiment of the present invention.

FIG. 12 shows a general flow chart of the present invention. At Steps 1201 and 1202, the voltage of the pre oxygen density sensor and the voltage of the post oxygen density sensor are received. At Step 1203, the outputs of the sensors are normalized. At Steps 1204 and 1205, the normalized values of the front and post oxygen density sensors are taken in by a one-cycle component, and a correlation characteristic calculation is carried out at Step 1206. At Steps 1207, 1208 and 1209, a correlation characteristic value of each cycle is averaged to calculate a variance and a degree of deterioration index is monitored.

Figure 13:
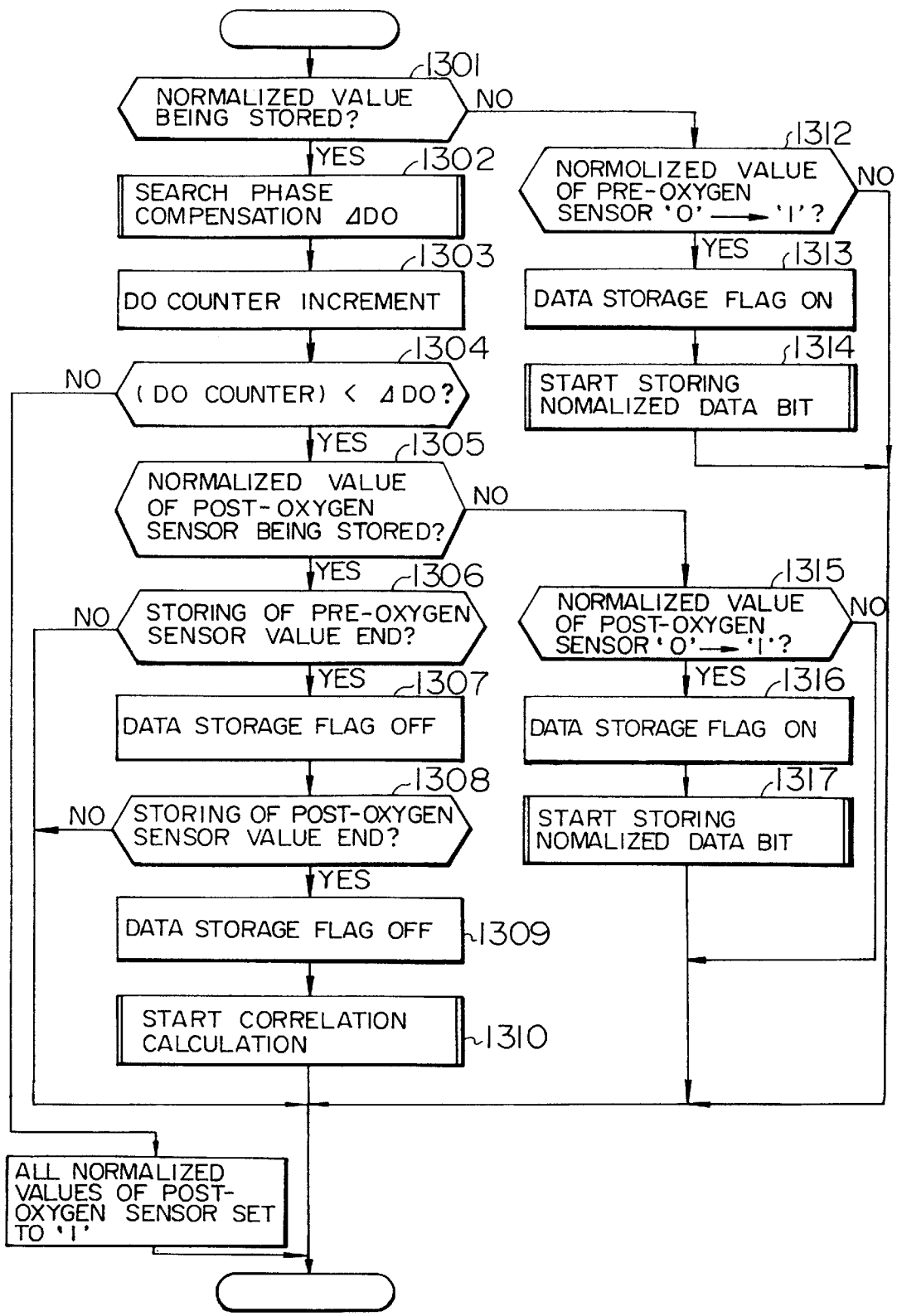
FIG. 13 is a flow chart showing the process of putting a normalized value of an output value of an oxygen sensor into a register.

FIG. 13 shows a flow chart for reading into the register normalized values of the output signals of the oxygen sensors (steps 1204–1206 of FIG. 12.). At Step 1301, a decision is made whether a normalized value of the pre oxygen density sensor is being read. If the decision is NO, the process is delayed until the normalized value of the pre oxygen density sensor has changed from 0 to 1 (Step 1312), when a data storage flag is set (Step 1313) and the storing of the normalized value is started at Step to 1314.

When the storing of the normalized value of the pre oxygen density sensor has started (Step 1301), a phase compensation value is searched at step 1302. When the phase compensation counter (which always increments) shows a value which exceeds the phase compensation value, a determination is made that the three way catalyst has not been deteriorated and all the normalized values of the post oxygen density sensor are set to 1, at Steps 1302, 1303 and 1311. When the counter shows a value at Step 1304 which is within the phase compensation value, a decision is made whether a normalized value of the post oxygen density sensor is being stored or not (Step 1305). If the decision is NO, the process is delayed until the normalized value of the post oxygen density sensor has changed from 0 to 1 (Step 1315) the normalized value has changed from 0 to 1, a data storage flag is set (Step 1316) and the storing of the normalized value is started at Step 1317. When the storing of the normalized values of the post oxygen density sensors and the normalized values of the pre oxygen density sensor has been completed (Steps 1306, 1808), the data storage flags are set to off (Steps 1307, 1309), and, a calculation of cross correlation is started at 1310.

Figure 14:
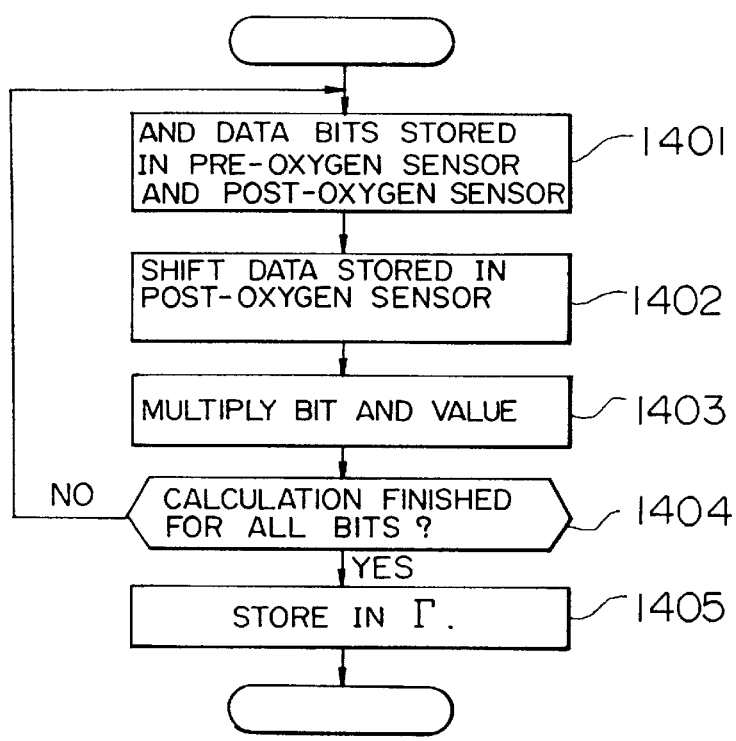
FIG. 14 is a flow chart showing a detailed example of a mutual correlation characteristic calculation.

FIG. 14 shows a flow chart of an example of a cross correlation calculation. At Step 1401, AND is taken for data bits of each register storing normalized values of the front and post oxygen density sensors respectively, and the data of the storage register of the post oxygen density sensor is shifted at Step 1402. This process is carried out for all the data bits. Although a normalized value of one cycle component is stored as two cycle components in the register of the post oxygen density sensor as explained above, it is also possible to store normalized values of two cycle components as they are, for the calculation. The calculation results are averaged to obtain one of deterioration indexes and then a variance is calculated.

Figure 15:
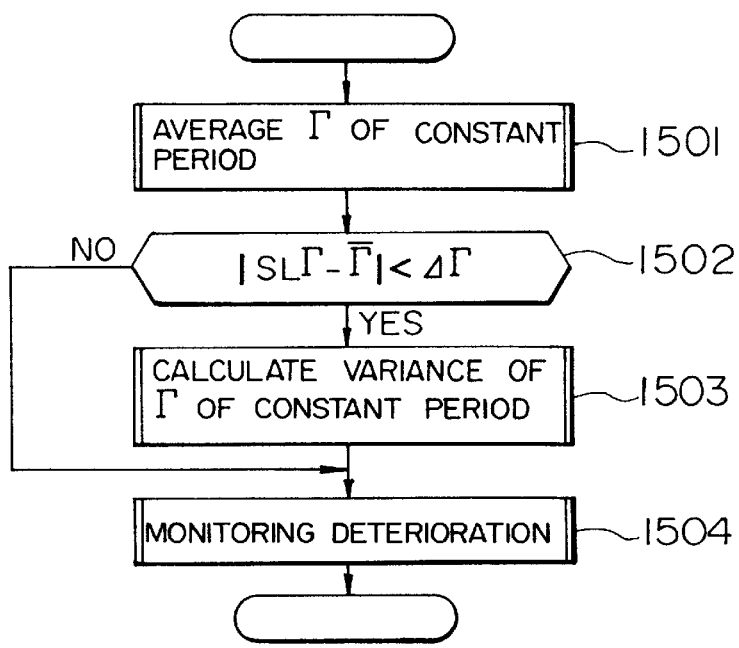
FIG. 15 is a flow chart showing a monitoring the operation for monitoring deterioration index.

FIG. 15 shows a flow chart for monitoring deterioration index. The deterioration indexes calculated are averaged within a determined section and a variance is calculated. It is needless to mention that, in the present invention, it is also effective to calculate a cross correlation directly from the output voltages of the oxygen sensors without normalizing these output voltages.

According to the present embodiment, it is possible to calculate and make determinations of the deterioration index at a high speed by using a small quantity of volatile memories and non-volatile memories. It is also possible to monitor deterioration index of a catalyst of which magnitude of deterioration index is medium that is difficult to be decided. Further, since a digital signal is used as an input, it simplifies an input circuit required.

As described above, according to the present invention, in monitoring a catalyst connected to an internal combustion engine, it is possible to decide deterioration index of the catalyst by maintaining an actual air and fuel ratio at a target air and fuel ratio.

We claim:

1. A control apparatus for an internal combustion engine having a catalyst for purifying an exhaust gas, comprising:

an air flow sensor for detecting a quantity of air taken into said internal combustion engine;

an idle speed detector for detecting an idle speed of said internal combustion engine;

first and second oxygen density sensors installed, respectively, upstream and downstream of a catalyst unit for purifying an exhaust gas connected to an exhaust pipe of said internal combustion engine;

a circuit for normalizing output signals of said first and second oxygen density sensors;

a memory for storing normalized output signals of said first and second oxygen density sensors, in digital form; and a data processor for:
calculating a correlation coefficient of output signals of said first and second oxygen density sensors by logically combining said stored normalized signals by means of a logical AND function;
determining a conversion efficiency of said catalyst unit based on said cross correlation coefficient; and
calculating a fuel injection quantity and feedback controlling a quantity of fuel supplied to said internal combustion engine, based on an output signal of at least one of said two oxygen density sensors.

2. A control apparatus for an internal combustion engine having a catalyst for purifying an exhaust gas according to claim 1, wherein conversion efficiency of said catalyst is obtained by using an absolute value of a calculated cross correlation coefficient.

3. A control apparatus for an internal combustion engine having a catalyst for purifying an exhaust gas according to claim 1, wherein conversion efficiency of said catalyst is obtained by using at least one of an absolute value of said correlation coefficient, a maximum value of said correlation coefficient, and a phase giving a maximum value of a correlation coefficient.

4. A control apparatus for an internal combustion engine having a catalyst for purifying an exhaust gas according to claim 1, wherein correlation coefficient is obtained for a period which is an integral multiple of a cycle of said air and fuel ratio feedback control.

5. A control apparatus for an internal combustion engine having a catalyst unit for purifying an exhaust gas according to claim 1, wherein:

said data processor also calculates a fuel injection quantity based on said quantity of air taken into said internal combustion engine and on said idle speed, and controls a quantity of fuel injected to said internal combustion engine in an open loop control process during an open loop control period which occurs sequentially with a period for obtaining a cross correlation function of said oxygen density sensors.

6. A control apparatus for an internal combustion engine having a catalyst unit for purifying an exhaust gas according to claim 1, wherein said data processor:

has a memory storing in advance a phase difference between outputs of said two oxygen density sensors installed at the upstream and downstream of said catalyst unit for purifying an exhaust gas for obtaining a cross correlation function; and obtains said cross correlation function between outputs of said first and second oxygen density sensors situated upstream and downstream of said catalyst, with said outputs displaced by said phase difference component.

7. A control apparatus for an internal combustion engine having a catalyst for purifying an exhaust gas according to claim 1, wherein said catalyst deterioration index is determined based on a maximum value of said cross correlation function.

8. A control apparatus for an internal combustion engine having a catalyst for purifying an exhaust gas according to claim 1, wherein said catalyst deterioration index is determined based on a phase giving a maximum value of a correlation characteristic function.

9. A catalyst deterioration index monitoring unit in a control apparatus for an internal combustion engine having a catalyst for purifying an exhaust gas, comprising:

a first oxygen density sensor, provided upstream of said catalyst;

a second oxygen density sensor provided downstream of said catalyst;

means for adjusting a quantity of fuel to be supplied to said internal combustion engine according to an output signal of one of said first and second oxygen density sensors;

a circuit for normalizing output signals of said first and second oxygen density sensors;

a memory for storing normalized output signals of said first and second oxygen density sensors, in digital form; and a microprocessor for:

determining a conversion efficiency of said catalyst by comparing output signals of said sensors, concurrently with said adjustment of said fuel supplied to said engine; and determining a degree of deterioration index of said catalyst from said conversion efficiency;

wherein said microprocessor determines said conversion efficiency of said catalyst by calculating a correlation coefficient of output signals of said first and second oxygen density sensors by logically combining said stored normalized signals by means of a logical AND function, and determines a conversion efficiency from said correlation coefficient.

10. A control apparatus for an internal combustion engine having a catalyst for purifying an exhaust gas, in which a first sensor used for detecting a degree of deterioration index of the catalyst is also used for determining an air-fuel ratio for controlling a quantity of fuel supplied to said internal combustion engine, wherein:

an output signal of said first sensor which is used for monitoring a degree of deterioration index of said catalyst, and an output signal of said first sensor which is used for detecting an air and fuel ratio, are substantially the same signal;

a second sensor for detecting said degree of deterioration index is installed on a side of said catalyst opposite said first sensor;

means are provided for normalizing output signals of said first and second sensors and storing said normalized output signals in digital form; and said control apparatus comprises a data processor for determining a conversion efficiency of said catalyst by calculating a cross correlation function of normalized output signals of said first and second sensors and a cross correlation function of a complement signal therefor, by logically combining said stored normalized signals by means of a logical AND function.

11. A control apparatus for an internal combustion engine having a catalyst for purifying an exhaust gas according to claim 10, wherein conversion efficiency of said catalyst is obtained by using at least one of an absolute value of said correlation coefficient, a maximum value of correlation coefficient and a phase giving a maximum value of said correlation coefficient.

12. A control apparatus for an internal combustion engine having a catalyst mounted in an exhaust path of said internal combustion engine, for purifying an exhaust gas thereof, said apparatus comprising:

first and second analyzing units mounted in said exhaust path, before and after said catalyst, respectively, for analyzing a state of nonhydrocarbon exhaust gas;

a circuit for normalizing output signals of said first and second analyzing unit;

a memory for storing normalized output signals of said first and second analyzing unit, in digital form; and a data processor for:

determining a degree of deterioration index of said catalyst by calculating a correlation coefficient of output signals of said first and second analyzing units by logically combining said stored normalized signals by means of a logical AND function;

determining a quantity of fuel to be supplied to said engine based on a signal according to an operating state of said engine including an output signal of at least one of said two analyzing units.

13. A control apparatus for an internal combustion engine having a catalyst for purifying an exhaust gas according to claim 12, wherein said first and second analyzing units are oxygen density detecting sensors for detecting an oxygen density in an exhaust gas.

14. A catalyst deterioration index monitoring unit in a control apparatus for an internal combustion engine having a catalyst arranged in a flow of exhaust gas for purifying said exhaust gas, said monitoring unit comprising:

a first oxygen density sensor for providing a signal for adjusting a quantity of fuel supplied to said internal combustion engine, said first oxygen density sensor being arranged upstream of said catalyst relative to a direction of flow of said exhaust gas;

a second oxygen density sensor arranged downstream from said catalyst relative to said direction of flow of said exhaust gas;

a circuit for normalizing output signals of said first and second oxygen density sensors;

a memory for storing normalized output signals of said first and second oxygen density sensors, in digital form; and a data processor for:
  comparing output signals of said first and second oxygen density sensors; and
  determining a catalyst deterioration index in response to results of said comparing;
wherein said comparing comprises evaluating a cross correlation function with respect to output signals of said first and second oxygen density sensors by logically combining said stored normalized signals by means of a logical AND function.

15. Method for controlling operation of an internal combustion engine and for concurrently monitoring a catalytic converter thereof, said catalytic converter being situated in an exhaust gas path for said engine, with a first oxygen density sensor situated upstream thereof relative to a direction of gas flow, and a second oxygen density sensor situated downstream thereof, said method comprising the steps of:

adjusting a quantity of fuel supplied to said internal combustion engine by means of feedback of an output signal of one of said first and second oxygen density sensors;

normalizing output signals of said first and second oxygen density sensors and storing said normalized output signals in digital form;

Calculating a correlation coefficient of output signals of said first and second oxygen density sensors by logically combining said stored normalized signals by means of a computer programmed to perform a logical AND function;

estimating conversion efficiency of said catalytic converter based on said correlation coefficient;

determining a degree of deterioration index of said catalytic converter based on said conversion efficiency estimated from said correlation coefficient, said determining step being performed concurrently with said feedback adjustment of said quantity of fuel supplied to said engine.

16. Process according to claim 15 wherein said step of calculating a correlation coefficient further comprises the steps of:

determining a lag time as a function of engine idle speed and lead time; and shifting a phase of said normalized output signals of said first and second oxygen density sensors by an amount equal to said lag time prior to carrying out said logical AND function.

* * * * *